Figure 1:
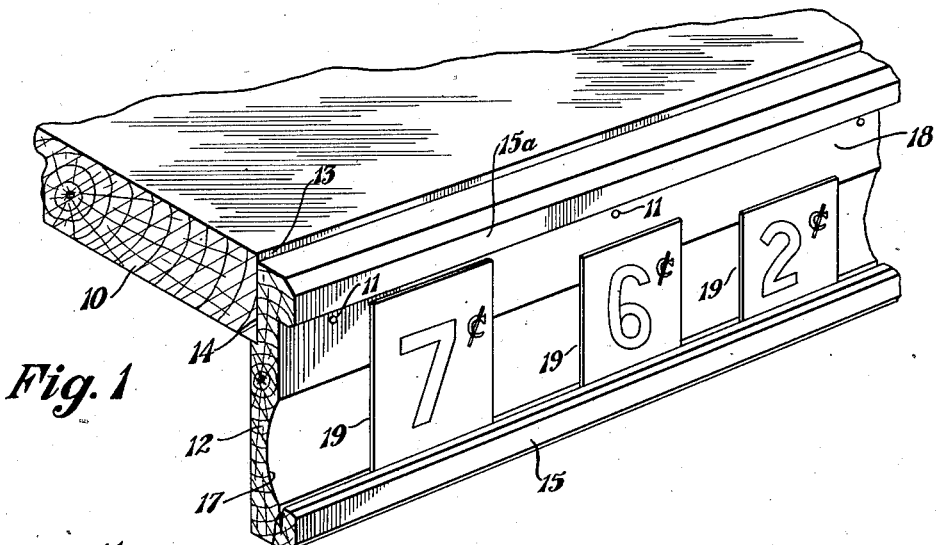

June 9, 1936.   H. E. MARSH   2,043,760

PRICE TAG MOLDING

Filed Jan. 27, 1936

Inventor
Harry E. Marsh
By Frease and Bishop
Attorneys

Patented June 9, 1936

2,043,760

UNITED STATES PATENT OFFICE 2,043,760

PRICE TAG MOLDING

Harry E. Marsh, Cleveland Heights, Ohio, assignor to Marsh Wall Tile Company, Dover, Ohio, a corporation of Ohio Application January 27, 1936, Serial No. 60,895

4 Claims. (Cl. 40—10)

The invention relates to molding adapted to be attached to the edges of shelving in stores and similar places where goods are displayed, producing not only an ornamental finish upon the shelf but also providing means for quickly and easily attaching or removing price tags or tickets indicating the prices or other information concerning the goods upon the shelves.

Such price tag moldings as have been previously designed and used ordinarily provide for holding the price tag or ticket under tension and usually provide grooves at opposite edges of the molding to receive opposite edge portions of the price tag or ticket, thus necessitating flexing of the price tag or ticket in order to place it upon the molding.

In order to remove the price tag or ticket from such moldings as are now in use, it is necessary that an intermediate portion of the price tag or ticket be grasped at opposite side edges between the fingers and the price tag flexed outwardly in order to withdraw the other two edges thereof from engagement in the grooves of the molding, or that a tool be inserted behind the price tag to flex the same outwardly and disengage it from the grooves in the molding.

As it is necessary, particularly in grocery stores and the like, to frequently change these price tags because of frequent special sales affecting the prices of many of the articles displayed upon the shelves, considerable time and labor are required upon the part of the storekeeper or clerks in removing and replacing these price tags.

In the usual form of price tag molding having grooves at opposite edges to receive opposite edge portions of the price tags or tickets, it is only possible to use one size of price tag with a molding of any given width and it is necessary that the price tags be of an exact length so as to fit the particular molding for which they are adapted.

An object of the present improvement is to provide a price tag molding in which the price tags or tickets are engaged only at one edge in a single groove at one edge of the molding, the price tag or ticket being held in flat position upon the molding so that it is not necessary that the same be flexed outwardly, by grasping it at opposite side edges or inserting a tool, in order to disengage the price tag from the molding, the molding being so constructed that with a single movement of one finger the price tag may be quickly and easily attached or detached as desired.

Another object is to provide a price tag molding arranged to receive and hold price tags of various lengths or heights.

A further object is to provide a price tag molding having a bead at its lower edge, a groove in said bead adapted to receive the lower edge portion of a price tag or ticket, a longitudinal recess adjacent to said groove and a longitudinal flat portion above the longitudinal recess, the face of said flat portion being in the same plane as the back of the groove so that a price tag or ticket inserted into said groove will lie flat against the flat portion without any tension upon the price tag, the upper edge portion of the price tag being free so that an upward movement of the price tag sufficient to disengage its lower edge from the groove will quickly and easily detach the price tag from the molding.

A still further object is to provide a price tag molding of the character described having a bead at the upper edge of the flat portion, the upper bead, however, having no groove therein, whereby the price tags or tickets which may be received and held upon the molding may be of any height so that the top of the tag will come anywhere from the bottom of the top bead to the bottom of the longitudinal flat portion of the molding, although preferably the height of the card should be such that its upper edge will be spaced below the bottom of the top bead of the molding a distance slightly less than the depth of the groove in the lower bead.

A further object is to provide a price tag molding having a groove in its lower bead, the groove being tapered downward so that cards of different thickness will wedge fit into the groove.

A further object is to provide a molding of this character having a groove in its lower bead, the groove being of such width and depth that a price tag or ticket of certain thickness may be anchored by friction therein.

Another object is to provide such a molding in which the groove may be of such a width and depth that the price tag will rest upon the bottom of the groove and still be held in line with the flat surface of the molding.

A still further object of the improvement is to provide a price tag molding, the rear surface of which may be provided at its upper portion with a rabbet to receive the front edge of a shelf to which the molding is to be attached so as to space th top of the molding a predetermined distance below the top surface of the shelf.

Figure 2:
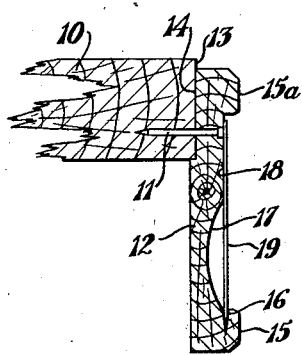
Figure 3:
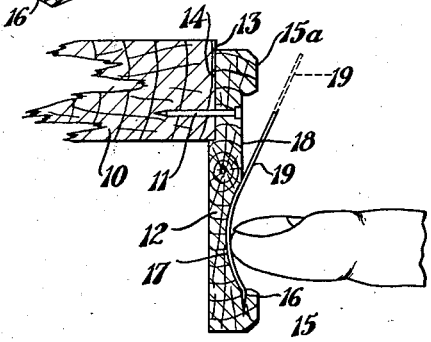
Figure 4:
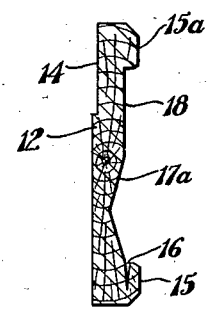
Figure 5:
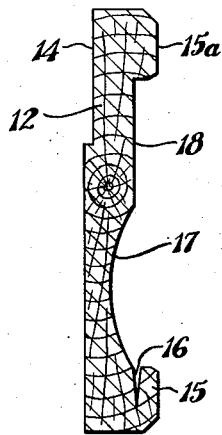
Figure 6:

The above objects, together with others which will be apparent from the drawing and following description or which may be later pointed out, may be attained by constructing the improved price tag molding in the manner illustrated in the accompanying drawing, in which Figure 1 is a perspective view of a portion of a shelf provided with the improved price tag molding, showing the manner of attaching tickets of various heights to the molding;

Fig. 2, a transverse sectional view through the improved molding attached to the edge portion of a shelf, showing a price tag mounted upon the molding;

Fig. 3, a view similar to Fig. 2, showing the manner in which a price tag may be quickly and easily attached to or removed from the molding by the movement of one finger;

Fig. 4, a transverse sectional view through a slightly modified form of the molding;

Fig. 5, an enlarged sectional view of the improved molding, showing the lower bead thereof provided with a tapered or wedge shaped groove; and Fig. 6, a similar view showing the lower bead provided with a straight groove.

Similar numerals refer to similar parts throughout the drawing.

At 10 is indicated a shelf of usual and well known construction, such as the ordinary wooden shelf commonly used in grocery stores and the like. The improved molding to which the invention pertains is adapted to be fastened to the front edge of such a shelf by any usual and well known means such as the nails indicated at 11, the molding being indicated generally by the numeral 12.

In order to prevent the upper edge of the molding from being marred by the goods placed upon or removed from the shelf, it is desirable that the molding be so attached to the shelf that its upper edge is spaced slightly below the top surface of the shelf as indicated at 13.

For the purpose of quickly and accurately locating the molding in proper position when it is attached to the front edge of the shelf, the rear face of the molding may be provided with a rabbet 14 at its upper portion to receive the front edge portion of the shelf and properly locate the top edge of the molding below the top surface of the shelf.

The molding is in the form of a long, relatively narrow strip of wood or the like which may be of greater width than the shelf. A bead 15 is formed at the lower edge of the molding overhanging the front face thereof and a groove 16 is formed in said bead. This groove is preferably wedge-shaped or tapered toward the bottom as shown in Figs. 1 to 5 inclusive so that tags of varying thickness may be received and wedge fitted therein so as to be held flat against the front face of the molding.

With such a shaped groove it will be seen that a thin tag will extend further down into the groove than a thicker tag but the lower edge of each will be wedge fitted into the groove so as to hold the tag in proper position.

If desired, the groove may have straight parallel sides as shown at 16a in Fig. 6 and may be of such a width and depth that a tag of a certain thickness may be frictionally held therein, or if desired, the groove may be of such a width and depth that the tag will rest on the bottom of the groove and still be held in proper position flat against the front face of the molding.

The front face of the molding is provided with a longitudinal depression extending upward from the lower bead 15 to a point substantially midway between the upper and lower edges of the molding. This depression may be of any cross sectional contour, being preferably curved as shown at 17 or may have two oppositely inclined flat surfaces as indicated at 17a. Located above this longitudinal depression is a longitudinal flat portion 18 located in the same plane as the rear wall of the groove.

A bead 15a, similar to the lower bead 15, may be formed at the upper edge of the molding, not only to give the molding a more finished appearance but also to act as a guard for the upper edges of the price tags to prevent them from being accidentally displaced from the molding, as will be later explained.

The price tags indicated generally at 19 may be of rectangular shape and may be formed of celluloid, cardboard or the like and should be of such height that when the lower edge of the tag is received in the groove of the lower bead 16 or 16a, the upper edge may be located anywhere between the bottom of the upper bead 15a and the top of the longitudinal recess 17, so that the upper portion of the tag will lie flat against the flat front portion 18 of the molding.

Preferably the tags are of such height that when the lower edge is received in the groove 16 or 16a, the upper edge will be spaced below the lower edge of the top bead 15a a distance less than the depth of the groove 16 or 16a as the case may be.

With a tag of this size it will be seen that the upper bead 15a acts as a guard to prevent the tag from being accidentally displaced, as should the tag be tilted in either direction, the upper edge thereof will strike the upper bead 15a before the lower edge of the tag is removed from the groove 16 or 16a in the lower bead.

Although the tags may be positioned upon the molding or removed therefrom by grasping each tag at its side edges between the thumb and forefinger, it will be seen that as shown in Fig. 3, the tags may be quickly and easily placed in position upon the molding or removed therefrom with the use of one finger.

In Fig. 3 the tag is shown in position to be removed from the molding, the finger flexing the tag inward against the longitudinal recess 17, throwing the upper edge of the tag outward beyond the upper bead 15a. An upward movement of the finger will then slide the tag upward out of engagement with the groove 16 into the position shown in broken lines, entirely releasing the tag from the molding.

By a reverse movement, the tag may be moved downward by the movement of one finger from the broken line to the full line position shown in Fig. 3 in order to insert a tag in the molding, thus permitting the tags to be easily and quickly inserted into or removed from the molding.

All of the types of tag molding that are used in present practice require that the price tags used therewith be flexible as it is necessary that the tag be flexed outward at its center in order to engage it in the two spaced grooves of the molding or disengage it therefrom.

With the present molding, if desired, a substantially rigid price tag may be used as it is not necessary that the tag be flexed to either place it in the molding or remove it therefrom. A rigid tag may be grasped between the thumb and forefinger and moved downward across the face of the molding to insert the lower edge of the tag into the groove 16 or 16a and may be grasped in the same manner to disengage the tag from the molding.

I claim:

1. A molding adapted to be attached to the edge of a shelf, a marginal bead at the lower edge of the molding having a longitudinal groove in its upper side, the front face of the molding having a longitudinally extending depression therein extending from said groove an appreciable distance upwardly therefrom, and a longitudinally extending flat portion above said depression and in line with the back wall of said groove, whereby a tag spanning said depression and having its lower edge portion received in said groove will lie flat against said flat portion.

2. A molding adapted to be attached to the edge of a shelf, a marginal bead at the lower edge of the molding having a longitudinal wedge-shaped groove in its upper side, the front face of the molding having a longitudinally extending depression therein extending from said groove an appreciable distance upwardly therefrom, and a longitudinally extending flat portion above said depression and in line with the back wall of said groove, whereby a tag spanning said depression and having its lower edge portion anchored in said groove will lie flat against said flat portion.

3. A molding adapted to be attached to the edge of a shelf, marginal beads at the upper and lower edges of the molding, the lower bead only having a longitudinal groove in its upper side, the front face of the molding having a longitudinally extending depression therein extending from said groove an appreciable distance upwardly therefrom, and a longitudinally extending flat portion above said depression and in line with the back wall of said groove, whereby a tag located between said beads with its lower edge received in said groove will lie flat against said flat portion of the molding.

4. A molding adapted to be attached to the edge of a shelf, a marginal bead at the lower edge of the molding having a longitudinal groove in its upper side, said groove being of such dimensions that a price tag may be frictionally engaged therein, the front face of the molding having a longitudinally extending depression therein extending from said groove an appreciable distance upwardly therefrom, and a longitudinally extending flat portion above said depression and in line with the back wall of said groove, whereby a tag spanning said depression and having its lower edge portion received in said groove will lie flat against said flat portion.

HARRY E. MARSH.